(12) United States Patent
Kronseder et al.

(10) Patent No.: US 7,296,851 B2
(45) Date of Patent: Nov. 20, 2007

(54) VEHICLE ROOF

(75) Inventors: Robert Kronseder, Hohenpolding (DE); Klaus Obendiek, Passau (DE); Walter Pecho, Ringelai (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 98 days.

(21) Appl. No.: 11/344,913

(22) Filed: Feb. 1, 2006

(65) Prior Publication Data

US 2006/0202521 A1 Sep. 14, 2006

Related U.S. Application Data

(63) Continuation-in-part of application No. 10/786,482, filed on Feb. 25, 2004, now abandoned.

(30) Foreign Application Priority Data

Feb. 28, 2003 (DE) .............................. 103 09 145

(51) Int. Cl.
*B60J 7/043* (2006.01)
(52) U.S. Cl. ........................ 296/216.03; 296/216.05; 296/224
(58) Field of Classification Search .............................
296/216.02–216.05, 224
See application file for complete search history.

(56) References Cited

U.S. PATENT DOCUMENTS

| 4,630,860 | A |   | 12/1986 | Fuerst et al. ................ 296/217 |
| 4,877,285 | A | * | 10/1989 | Huyer .................... 296/216.03 |
| 5,058,947 | A |   | 10/1991 | Huyer .................... 296/216.03 |
| 5,238,290 | A |   | 8/1993 | Farmont ...................... 296/216 |
| 5,405,185 | A |   | 4/1995 | Cheron et al. .............. 296/223 |
| 5,447,355 | A |   | 9/1995 | Kelm .......................... 296/223 |
| 5,709,427 | A |   | 1/1998 | Farber et al. ................ 296/214 |
| 6,158,803 | A |   | 12/2000 | Reihl et al. ............ 296/216.04 |
| 6,443,520 | B1 | * | 9/2002 | Schmaelzle et al. ... 296/216.08 |
| 6,942,286 | B2 | * | 9/2005 | Bohm et al. ........... 296/216.05 |

FOREIGN PATENT DOCUMENTS

| DE | 35 44 940 | 7/1987 |
| DE | 40 37 975 | 6/1991 |
| DE | 42 27 400 C2 | 2/1994 |
| DE | 44 05 583 | 9/1994 |
| DE | 195 00 367 | 3/1996 |
| DE | 195 25 839 | 8/1996 |
| DE | 197 13 347 | 5/1999 |

(Continued)

*Primary Examiner*—Dennis H. Pedder
(74) *Attorney, Agent, or Firm*—Davidson, Davidson & Kappel, LLC

(57) ABSTRACT

A vehicle roof, comprising an opening roof panel, which can be moved from a first, closed roof position into a second, fully opened roof position, the roof panel being held essentially parallel to the rest of the vehicle roof and at a distance from the rest of the vehicle roof in the second roof position; a lateral guide, the roof panel being guided at least during a part of an opening movement on the guide; a third, partially opened roof position in which the roof panel is held in a position that is essentially inclined with respect to the rest of the vehicle roof, rising counter to the direction of travel; and an elevating means for elevating a front edge area of the roof panel.

18 Claims, 18 Drawing Sheets

FOREIGN PATENT DOCUMENTS

| | | |
|---|---|---|
| DE | 198 08 599 | 7/1999 |
| DE | 42 38 944 | 10/2003 |
| EP | 0 938 993 | 9/1999 |
| EP | 0 999 080 | 5/2000 |
| GB | 340 064 | 12/1930 |
| JP | 6156085 | 6/1994 |
| JP | 6191281 | 7/1994 |

* cited by examiner

VEHICLE ROOF

RELATED APPLICATIONS

This application is a continuation-in-part of U.S. Pat. No. 10/786,482 filed Feb. 25, 2004 now abandoned, the entire disclosure of which is incorporated by reference herein.

BACKGROUND INFORMATION

The invention relates to a vehicle roof, comprising an opening roof panel, which can be moved from a first, closed roof position into a second, fully opened roof position, the roof panel being held essentially parallel to the rest of the vehicle roof and at a distance from the rest of the vehicle roof in the second roof position, and a lateral guide, the roof panel being guided at least during a part of an opening movement on the guide.

In modern vehicle construction there is a demand for roofs that can be partially opened, giving the largest possible roof opening. This affords the vehicle user driving pleasure comparable to that obtainable with the roof of a full convertible without the disadvantages associated with roofs of such convertibles.

DE 42 38 944 C1 describes a vehicle roof that can be opened and in which an extensive roof panel in a rear area is guided by means of guide pins in guides which are formed in a roof luggage rail. When opening the roof, the roof panel can first be moved by means of a deployment lever into an intermediate position raised at the rear in which the roof panel assumes an inclined position. On reaching the intermediate position, the roof panel can be displaced into a fully opened position toward the rear of the vehicle, the inclination of the roof panel being maintained. This has the disadvantage that the inclination of the roof panel fundamentally prevents the roof panel being displaced by its full length. The proposed solution to this, however, which involves disengaging the deployment lever from the roof panel in the course of the roof opening sequence in order to achieve the greatest possible travel, can also impair the reliability of the drive mechanism due to the increasing mechanical tolerances that occur in use. Furthermore, the proposed vehicle roof does not permit additional positions of the roof panel such as a raised, opened position parallel to the rest of the roof.

DE 42 27 400 C2 describes an opening roof part guided on a guide rail which is formed in the manner of a roof rail, parts of a driving device for the roof part being arranged outside a sealed inner space of the vehicle even with the roof part closed, hence those parts of the driving device being unprotected from weather impact.

DE 195 25 839 C1 describes an opening roof part guided on a guide rail which is formed in the manner of a roof rail, it being impossible to move the roof part by its entire length due to an inclined position of the roof part.

SUMMARY OF THE INVENTION

An object of the invention is to specify a vehicle roof in which a maximum and at the same time versatile opening of the roof can be achieved.

This and other objects are achieved by the invention.

A vehicle roof according to the invention comprises an opening roof panel, which can be moved from a first, closed roof position into a second, fully opened roof position, the roof panel being held essentially parallel to the rest of the vehicle roof and at a distance from the rest of the vehicle roof in the second roof position; a lateral guide, the roof panel being guided at least during a part of an opening movement on the guide; a third, partially opened roof position in which the roof panel is held in a position that is essentially inclined with respect to the rest of the vehicle roof, rising counter to the direction of travel; and an elevating means for elevating a front edge area of the roof panel.

This achieves the advantage that any inclination of the moveable roof panel does not restrict its travel when it is run from the closed position into the fully opened position, so that an especially large roof opening is ultimately possible. A means of elevating a front edge area of the roof panel is provided, so that by operating the elevating means the roof panel can assume a position parallel to the rest of the roof and at a distance therefrom.

In a preferred embodiment, the roof panel is advantageously connected to a first slide element moveably accommodated in a guide rail and the elevating means comprises a telescopic guide and a control lever having a slotted link and pivotally connected to a second slide element, so that the front edge area of the roof panel can be elevated by simple mechanical means. In particular, the elevation of the front edge area can be accomplished in that the roof panel is forcibly carried by a movement of the first slide element in relation to the second slide element, the second slide element being releasably held by means of a catch lever and capable of being releasably fixed to the first slide element by means of a coupling element.

In a particularly preferred embodiment of the present invention a fourth, partially opened roof position is furthermore provided, in which the roof panel is held in a position essentially parallel to the rest of the vehicle roof and at a distance from the rest of the vehicle roof. This creates, in addition to the third, inclined position, a ventilation position of the roof, which is available as an alternative depending on the road speed and weather conditions.

The lateral guides are formed, for particular preference, on rail elements which stand proud of a surface of the vehicle roof in the manner of roof luggage rails. This represents a simple way of ensuring a significant lift of the roof panel in its rear end area whilst ensuring a secure guide and mounting.

A guide element supporting the roof panel on the guides and moveable in the guides is preferably moveable in relation to the roof panel. The rear end area of the roof panel can thereby be easily raised by movement of the guide elements, without the need to move the roof panel itself rearward.

An especially preferred embodiment of a vehicle roof according to the invention comprises a guide element which is assigned to the lateral guides and can be moved in relation to the roof panel by means of a push rod, a simple actuation of the push rod for elevating a rear edge area of the vehicle roof preferably being achievable in that the push rod is operatively connected to the first slide element.

In order to achieve automatic driving of the vehicle roof, the first slide element can advantageously be driven in particular by a Bowden cable that is capable of transmitting both push and pull forces.

In a preferred embodiment of a vehicle roof according to the invention a further, non-opening, transparent roof element is arranged behind the roof panel, so that an especially large overall roof area is transparent.

A vehicle roof according to the invention preferably has a driveable, opening anti-glare device, which for particular preference comprises a first driveable reel and a second driveable reel. In this way multiple sections of the vehicle roof can be separately covered or exposed.

In an especially preferred embodiment of a vehicle roof according to the invention a pivotable wind deflector is furthermore provided on the vehicle roof so that air vortices in the area of the opened roof and corresponding wind noises are effectively reduced. Raising of the wind deflector can preferably be controlled automatically by an opening movement of the roof panel. In an especially simple and therefore advantageous embodiment, the wind deflector is operatively connected to a control lever, the control lever at the same time driving the roof panel when raising it. In a simple mechanical embodiment the control lever can be disengaged from the wind deflector when opening the roof panel.

Further advantages and features of the vehicle roof according to the invention are set forth in the example of an embodiment described below and in the dependent claims.

A preferred example of an embodiment of a vehicle roof according to the invention is described below and explained in more detail with reference to the drawings attached.

DETAILED DESCRIPTION OF A PREFERRED EMBODIMENT

Figure 1:
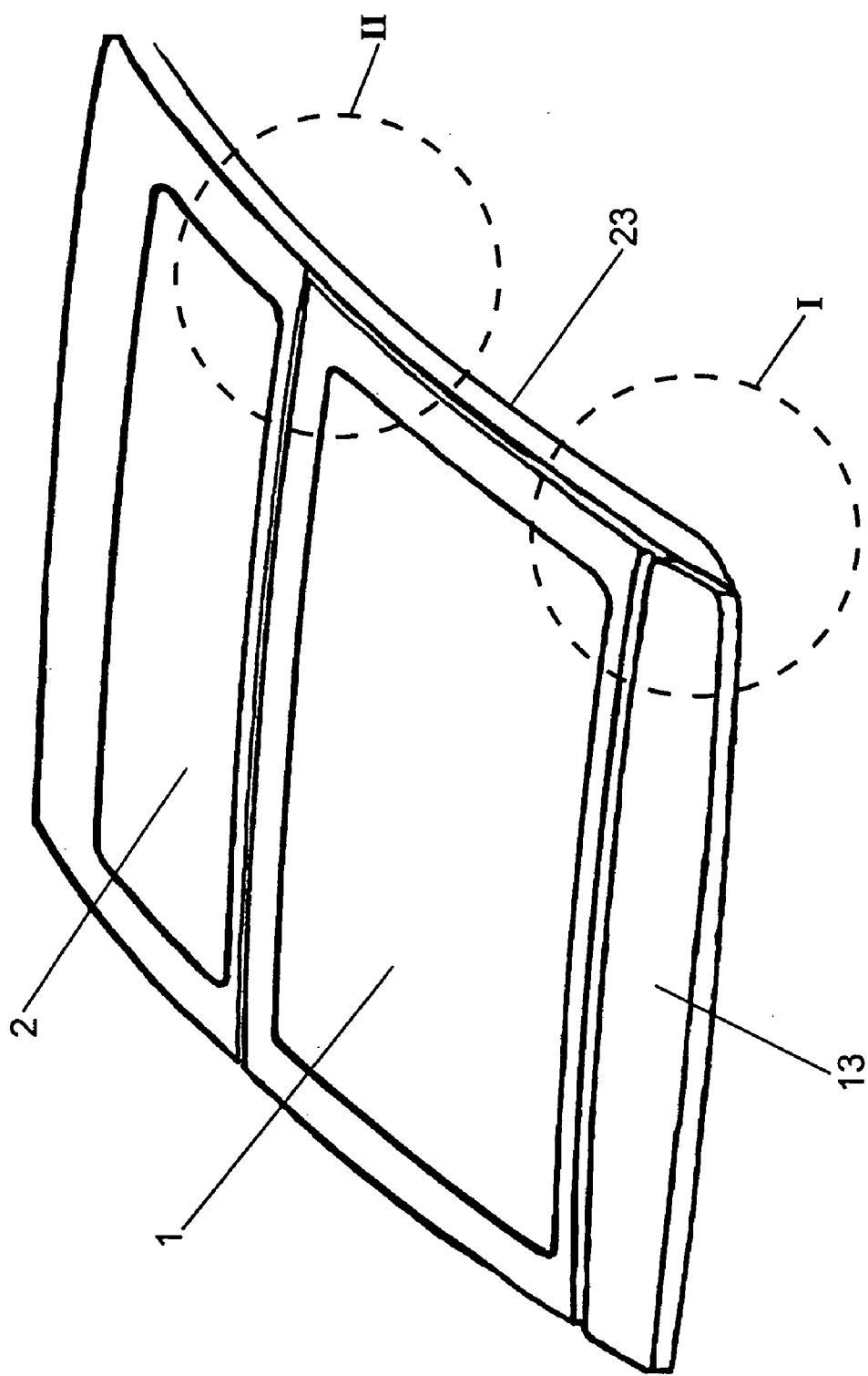
FIG. 1 shows a schematic, perspective top view of a vehicle roof according to the invention in a closed position.

The vehicle roof according to the invention comprises a moveable, opening roof panel 1, which is preferably composed of glass or a transparent plastic and is arranged in front of a likewise transparent, non-opening roof element 2 when the roof is in a closed position (FIG. 1). The roof panel 1 comprises a support element 1a, preferably composed of metal, to which it is fixed by means of fasteners.

A raisable wind deflector 13 is arranged in front of the roof panel 1 in the direction of travel and is articulated on the body of the vehicle or at a front edge of the roof opening.

Figure 2:
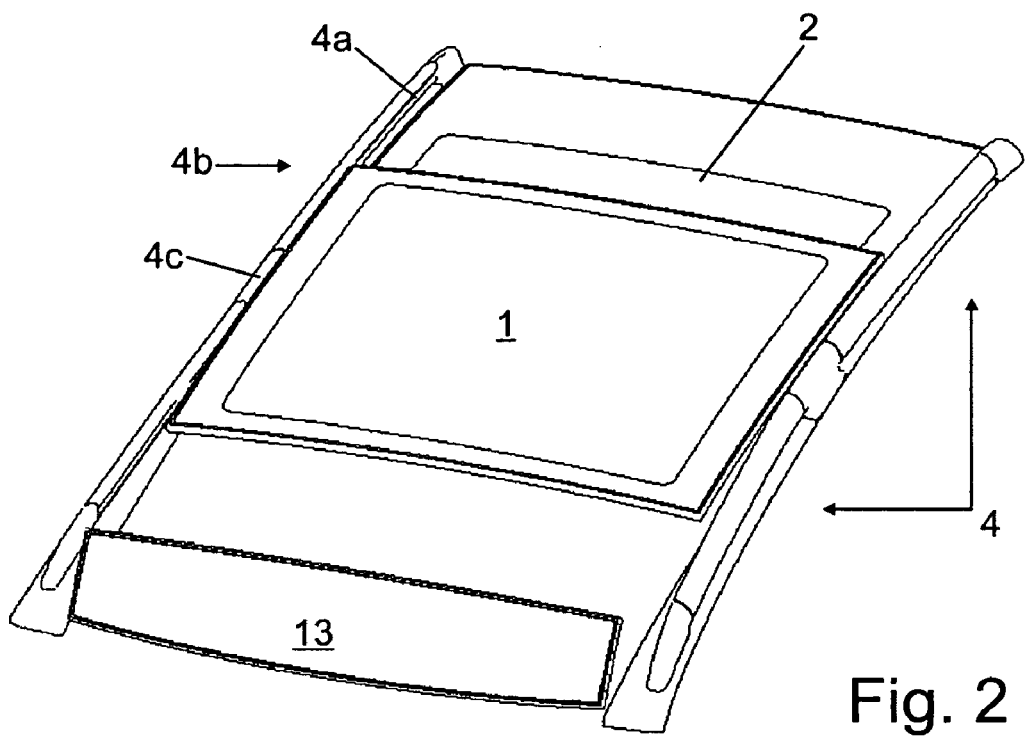
FIG. 2 shows the vehicle roof of FIG. 1 in a partially opened position.
Figure 3:
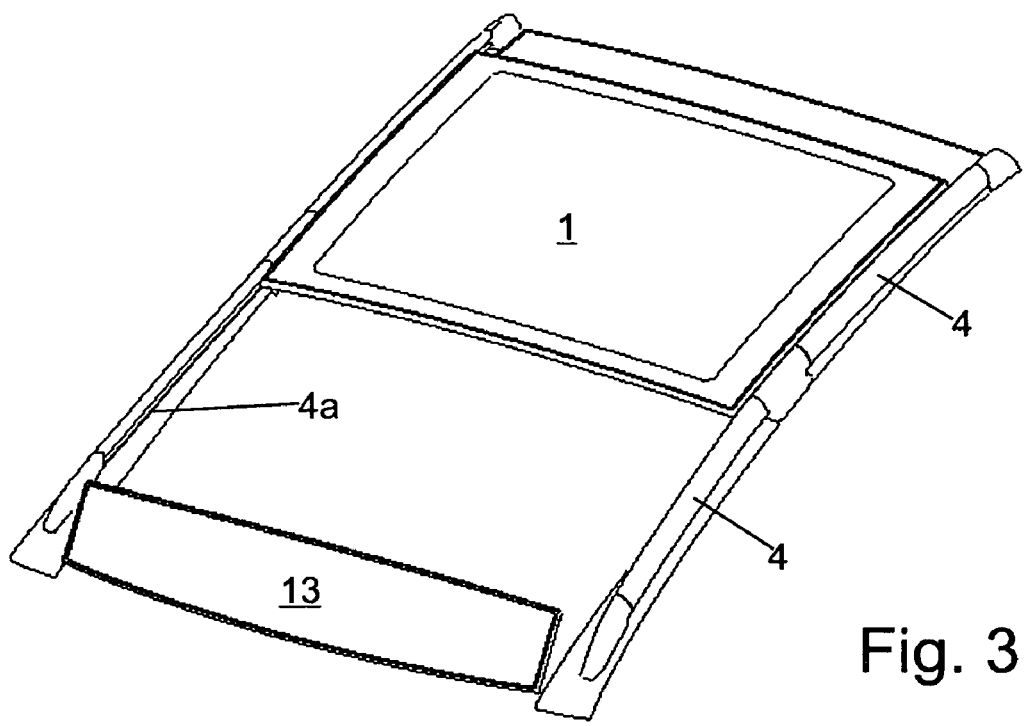
FIG. 3 shows a schematic, perspective top view of a vehicle roof according to the invention in a fully opened position.
Figure 4:
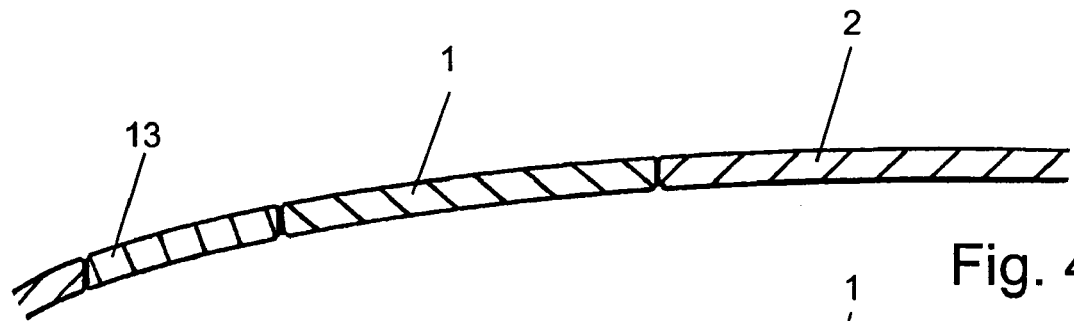
FIG. 4 shows the vehicle roof of FIG. 1 in a simplified cross-sectional view in a closed position as shown in FIG. 1.
Figure 5:
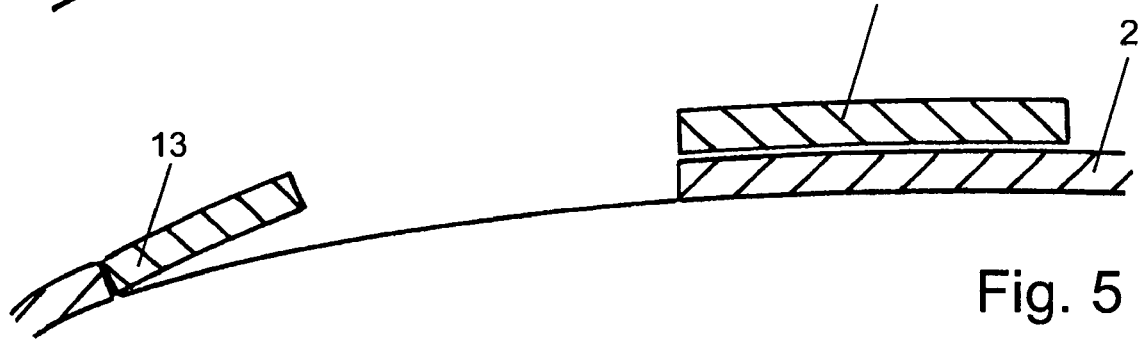
FIG. 5 shows the vehicle roof in a second, fully opened roof position in a simplified cross-sectional view.
Figure 6:
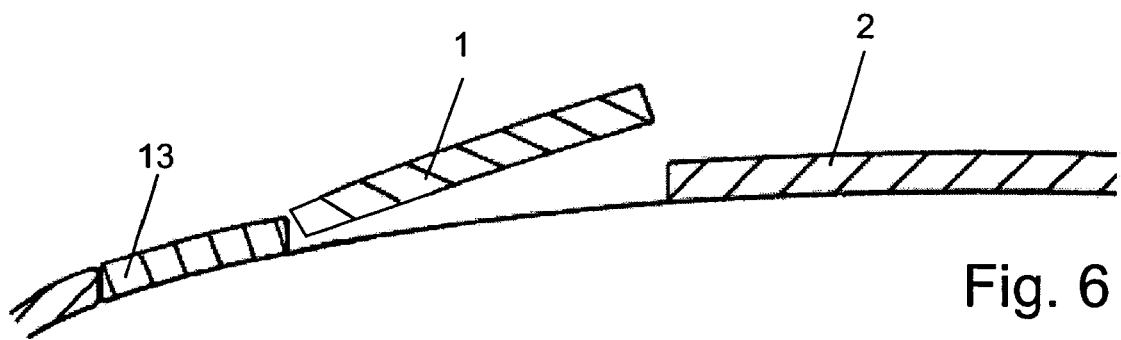
FIG. 6 shows the vehicle roof in a third, partially opened roof position in a simplified cross-sectional view.
Figure 7:
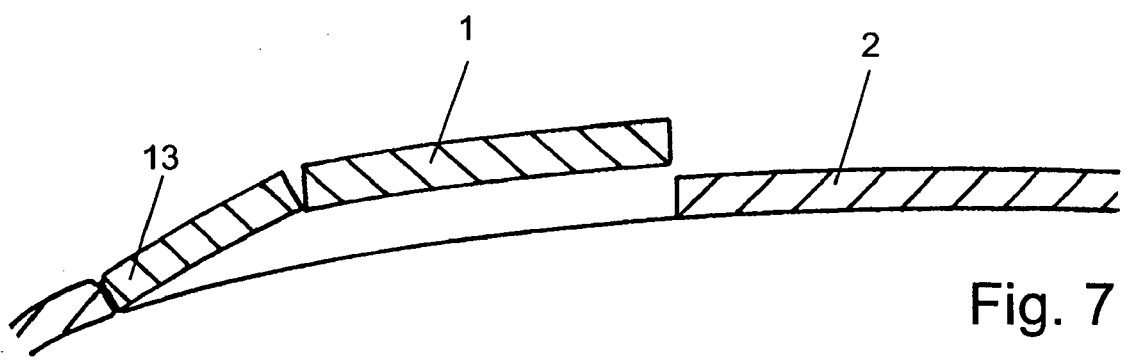
FIG. 7 shows the vehicle roof in a fourth, partially opened roof position.

Starting from the first closed roof position as shown in FIG. 1, the roof panel 1 can be moved backwards into a partially opened position as shown in FIG. 2, before it reaches a second fully opened roof position as shown in FIG. 3. The different positions of the roof panel 1 are also shown in the simplified cross-sectional views of FIG. 4 to FIG. 7. FIG. 4 shows the roof panel 1 in its first closed roof position. FIG. 5 shows the roof panel 1 in its second, fully opened roof position in which the roof panel 1 is held essentially parallel to the non-opening roof element 2, i.e. to the rest of the vehicle roof. FIG. 6 shows the roof panel 1 in a third, partially openend roof position in which the roof panel 1 is held in a position that is essentially inclined with respect to the rest of the vehicle roof, rising counter to the direction of travel. FIG. 7 shows the vehicle roof 1 in a fourth, partially opened roof position in which the roof panel 1 is held in a position essentially parallel to the rest of the vehicle roof and at a distance from the rest of the vehicle roof. In its fourth roof position, the roof panel 1 is not yet moved above the non-opening roof element 2. Details of the functioning of moving the roof panel 1 between its different roof positions are further explained below.

In the vehicle longitudinal direction the mechanism of the vehicle roof is of essentially symmetrical design on each of the two vehicle sides, so that only one side will be described.

Figure 8:
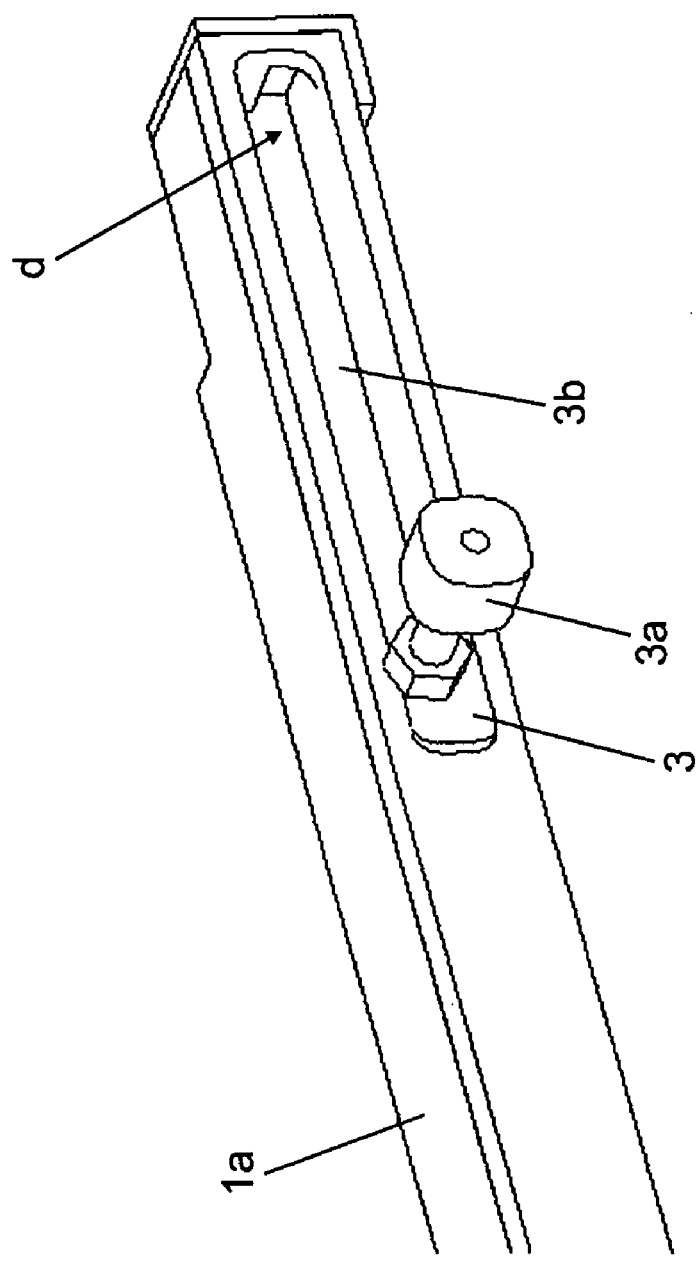
FIG. 8 shows a perspective, detailed view of a guide element for guiding a rear edge area of the opening roof panel.
Figure 9:
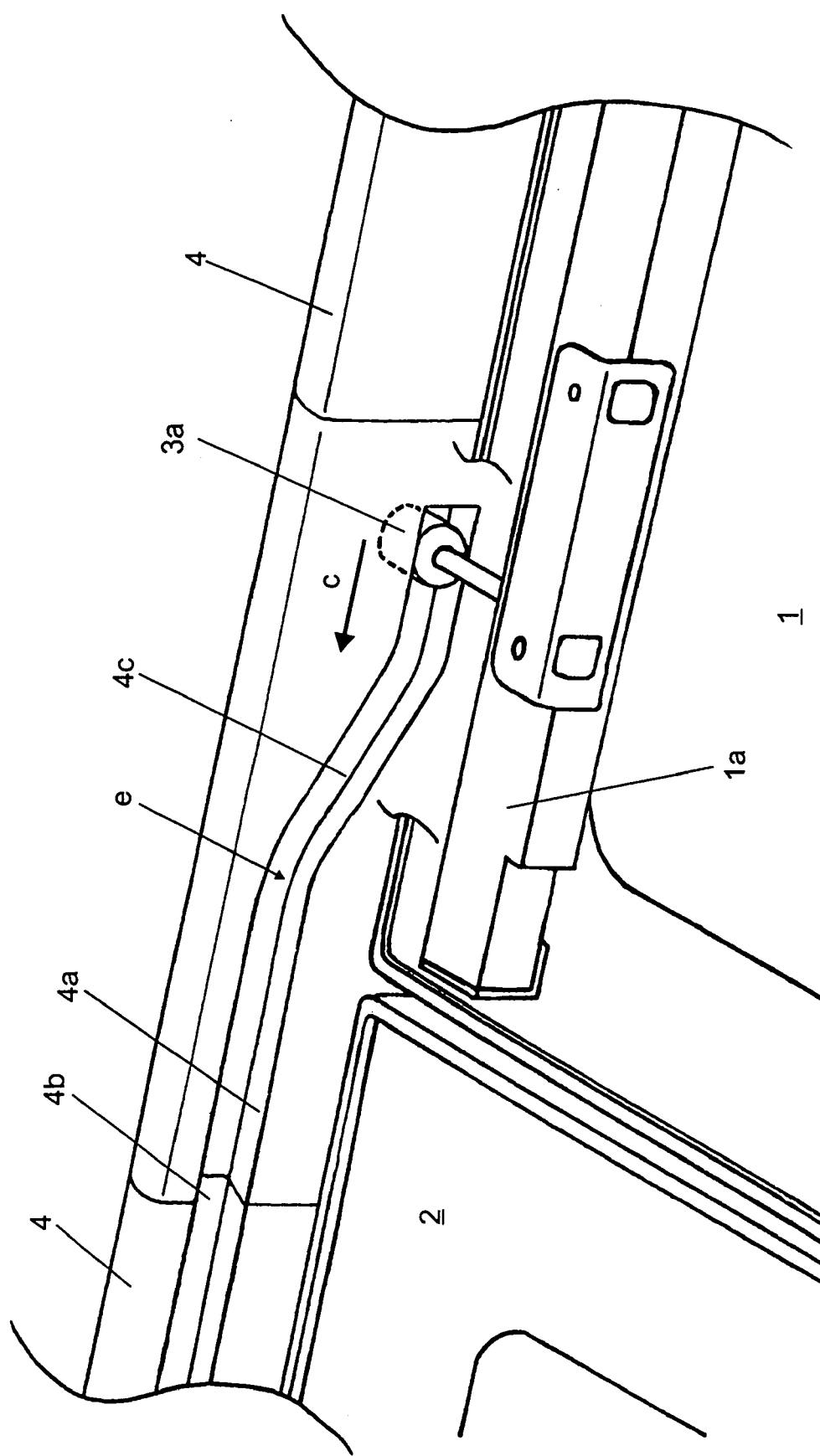
FIG. 9 shows a perspective, more detailed view according to the area II of FIG. 1 of a support element with a guide element which is guided in a rail element of the vehicle roof.

As shown in FIG. 8, the support element 1a of the roof panel 1 is essentially designed as a profiled rail with a push rod 3, which is moveably guided in the support element 1a, passing through it. A guide element 3a, which is accommodated and guided so that it can slide in a lateral guide 4a of a rail element 4 in the form of a roof luggage rail, is formed at a rear end of the push rod 3. As shown in FIG. 2 and FIG. 9 for example, the rail element 4 comprises a rear rail area 4b, in which the guide 4a runs straight and essentially horizontally, and a centre foot 4c, in which the guide 4a assumes an inclined path and in the closed state terminates in a rear end area of the roof panel 1. FIG. 8, in particular, shows that the guide element 3a can be moved by the push rod 3 inside a recess 3b provided in the support element 1a.

The simplified perspective view of FIG. 9 shows the area II of FIG. 1 in greater detail. FIG. 9 reveals that the lateral guide 4a is formed on the rail element 4, which stands proud of the surface of the vehicle roof, i.e. the surface of the non-opening roof element 2. The rail element 4 is located at a distance from the surface of the vehicle roof, i.e. from the surface of the non-opening roof element 2. The lateral guide 4a runs straight and essentially horizontally in the rear rail area 4b, wherein the lateral guide 4a assumes an inclined path in the center foot area 4c of the rail element 4. The guide element 3a, which is attached to the push rod 3, is guided within the lateral guide 4a of the rail element 4.

The support element 1a is laterally fixed on both sides of the opening roof panel 1. As shown in FIG. 8, the guide element 3a can be moved along the recess 3b and is thus movable in relation to the roof panel 1. In FIG. 9 the roof panel 1 is shown in its first closed position (cf. FIG. 1, FIG. 4) wherein the guide element 3a is in the position of FIG. 8. Upon moving in a longitudinal direction of the vehicle, the guide element 3a reaches the different areas of the lateral guide 4a. Since the guide element 3a is guided within the lateral guide 4a as explained above, the guide element 3a supports the roof panel 1 on the lateral guide 4a and the rail element 4, respectively.

Figure 10:
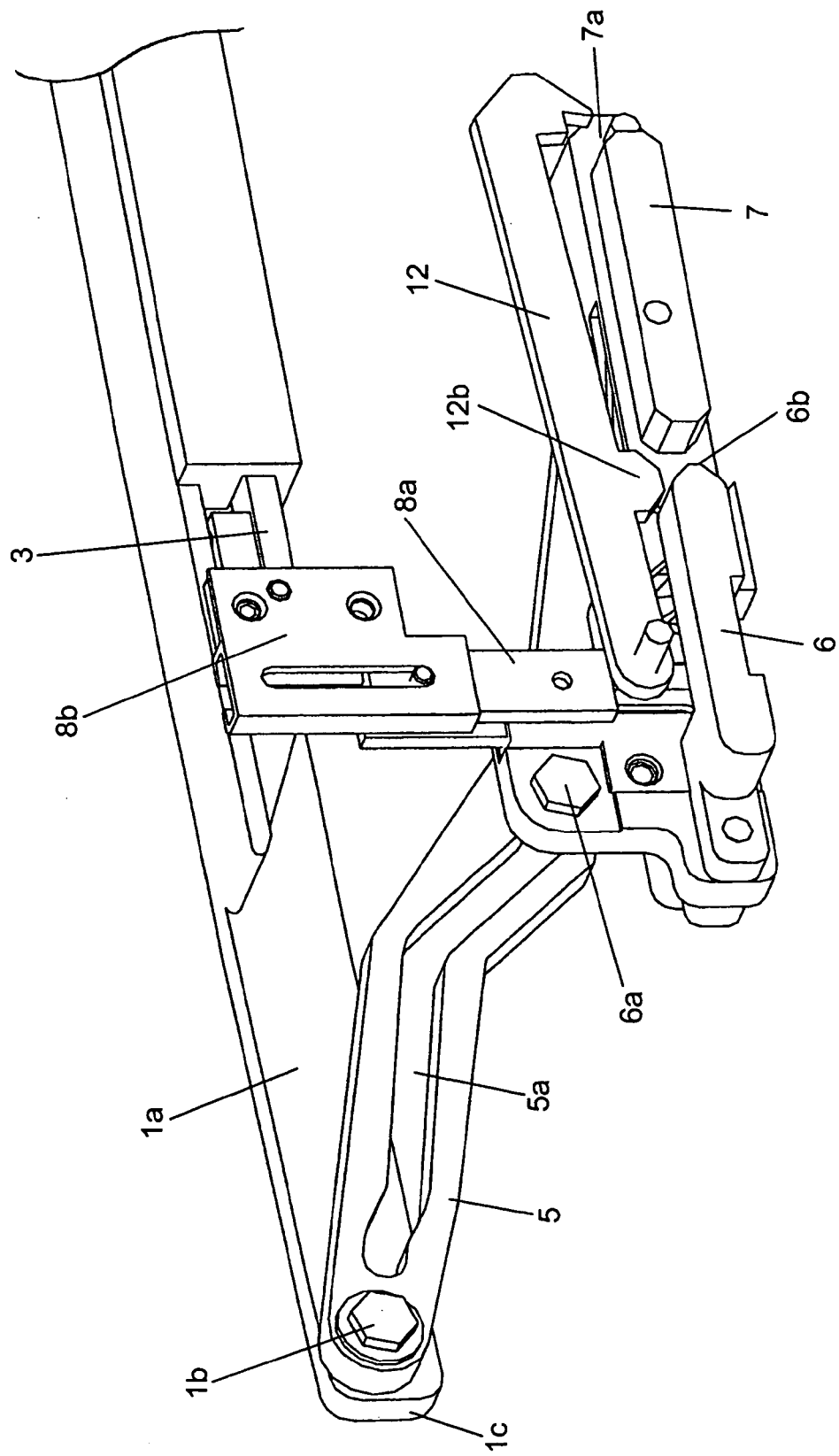
FIG. 10 shows a perspective view of a part of the drive mechanism omitting some components.

As shown in FIG. 10, a front end area 1c of the support element 1a is articulated on one end of an elongated control lever 5 by means of a hinge 1b. The control lever 5 has a multiply wound slotted link 5a, which is formed as a slotted opening in the control lever 5.

It is to be understood that the perspective view of FIG. 10 is simplified in that some parts of the moving mechanism are not shown for reasons of clarification.

A first slide element 6 has a link pin 6a, which engages in the slotted link 5a of the control lever 5. At its end opposite the articulation of the support element 1a, the control lever 5 is articulated on a second slide element 7.

Figure 11:
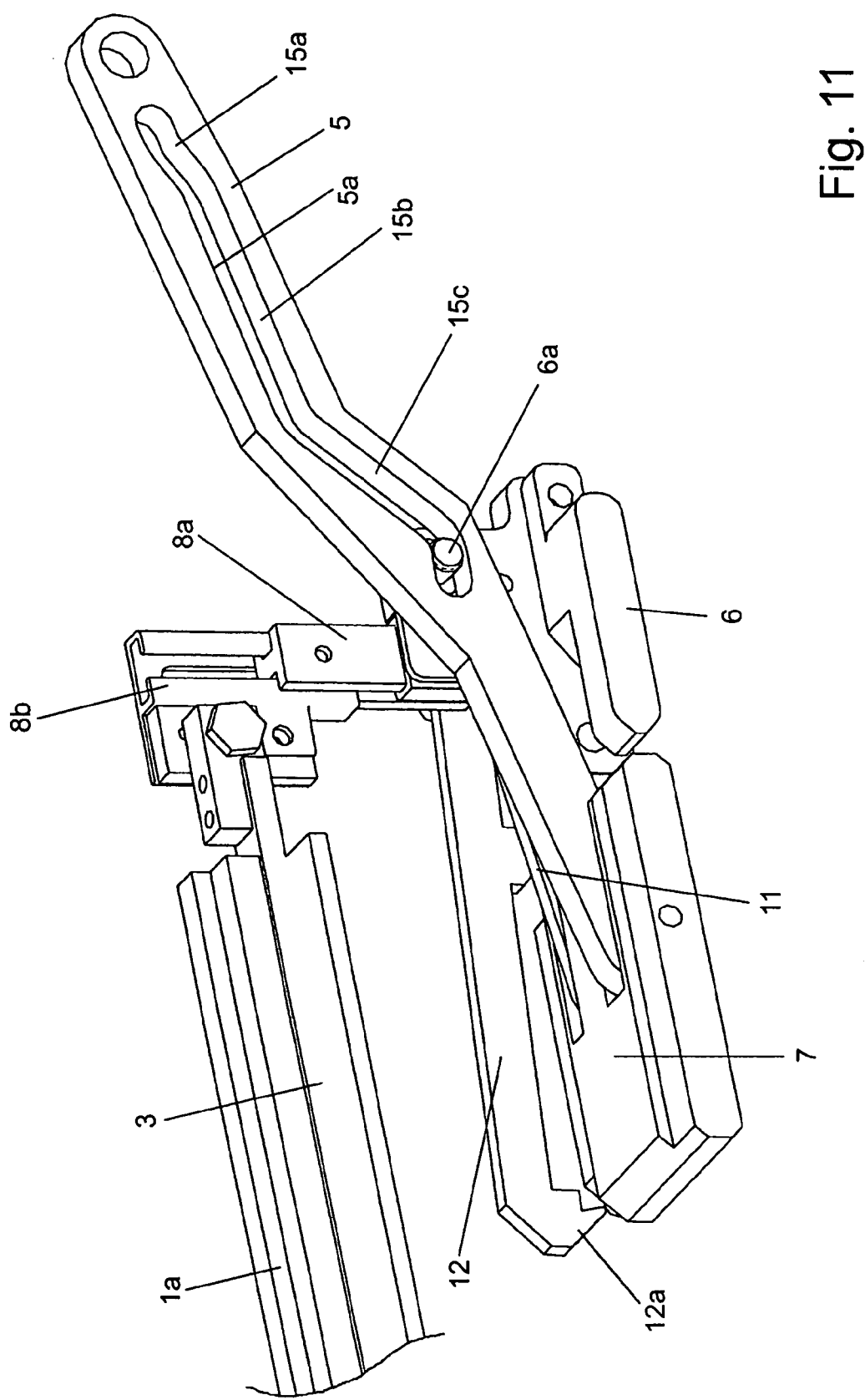
FIG. 11 shows a rear perspective view of the drive mechanism of FIG. 10 omitting some components.

FIG. 11 is a rear view of that shown in FIG. 10 wherein the support element 1a is not shown for reasons of simplification only. It is clearly shown that the control lever 5 is articulated on the second slide element 7. Further, the link pin 6a of the first slide element 6 engages the slotted link 5a of the control lever 5. The slotted link 5a comprises three portions, i.e. a first bent area 15a, a straight level area 15b and a straight, inclined area 15c. The more the link pin 6a is guided within the slotted link 5a in direction of the end of the inclined area 15c (like in the position shown in FIG. 11), the more the control lever 5 is pivoted upwards relative to the second slide element 7 (counterclockwise in FIG. 11), i.e. the more the distal end of the control lever 5, which is pivotally connected to the support element 1a (cf. FIG. 10), is elevated. The functioning of the different areas of the slotted link 5a is further explained below.

As shown in FIG. 10 and FIG. 11, a lower half 8a of a telescopic guide 8 is fixed to the first slide element 6. An upper half 8b of the telescopic guide 8 is accommodated on the lower half 8a so that it is displaceable in an essentially vertical direction in relation to the latter. The upper half 8b of the telescopic guide 8 is articulated on a front end of the push rod 3 projecting from the support element 1a that guides the push rod 3. In total, the telescopic guide 8 with its connected parts forms out an elevating means 5, 6, 7, 8 for elevating a front region of the roof panel 1. This elevating means is independent from the rail element 4 which is responsible for an elevation of a rear region of the roof panel 1. Thereby the elevating means 5, 6, 7, 8 according to the invention as well as the driving cables, driving motors (not shown) and major parts of the roof mechanism can be arranged such that those parts are not exposed to weather influence in a closed state of the roof panel 1. In the closed state, those parts are arranged within the inner space of the vehicle with respect to seals of the roof part.

The articulation of the push rod 3 on the upper half of the telescopic guide 8b being linked to the first slide element 6 (cf. FIG. 10) provides for a connection of the first slide element 6 to the guide element 3a. Thus, when the first slide element 6 is moved in the longitudinal direction of the vehicle, the guide element 3a is moved in relation to the roof panel 1 if it travels within the recess 1b as shown in FIG. 8.

Figure 12:
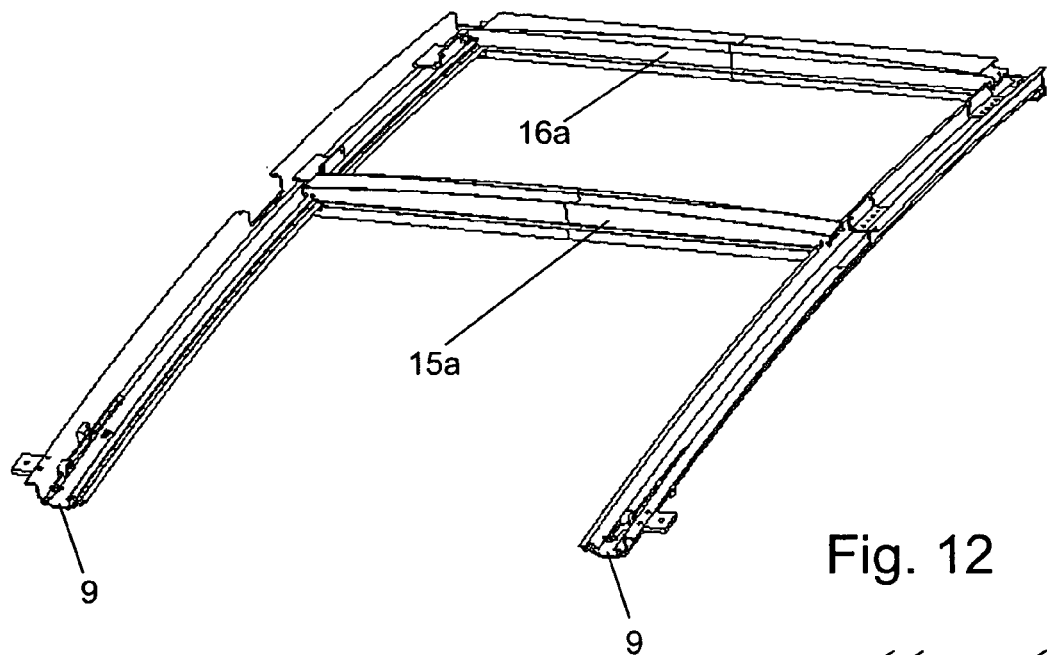
FIG. 12 shows a perspective view of guide rails for the vehicle roof of FIG. 1.
Figure 13:
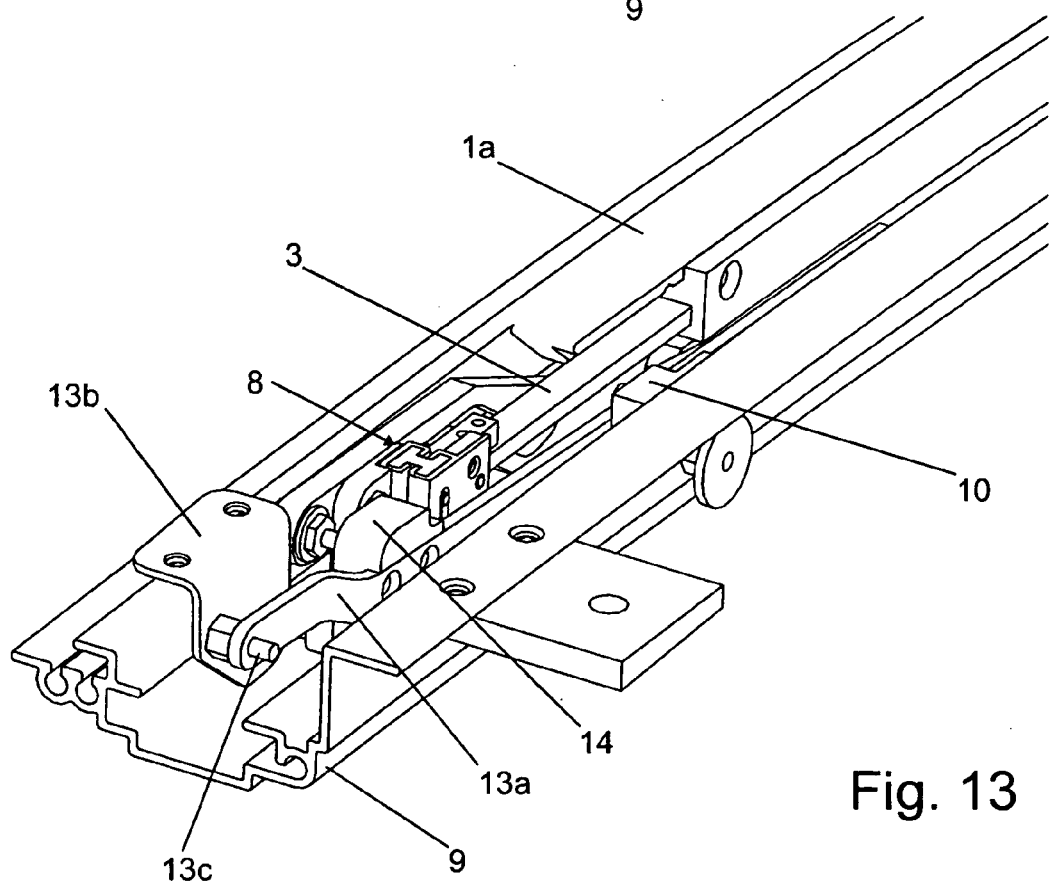
FIG. 13 shows a perspective view of a part of a drive mechanism for the vehicle roof according to the invention in a closed position.

As shown in FIG. 12 and FIG. 13, both the first slide element 6 and the second slide element 7 are each held in a guide rail 9 aligned essentially in a horizontal direction. The guide rail 9 is profiled so that the slide elements 6, 7 are each moveable in the longitudinal direction of the rail, the first slide element 6 being arranged in front of the second slide element 7 in the direction of travel. On lateral areas of a roof opening corresponding to the roof panel 1, the guide rail 9 is immovably fixed in relation to the rest of the vehicle body.

Figure 14:
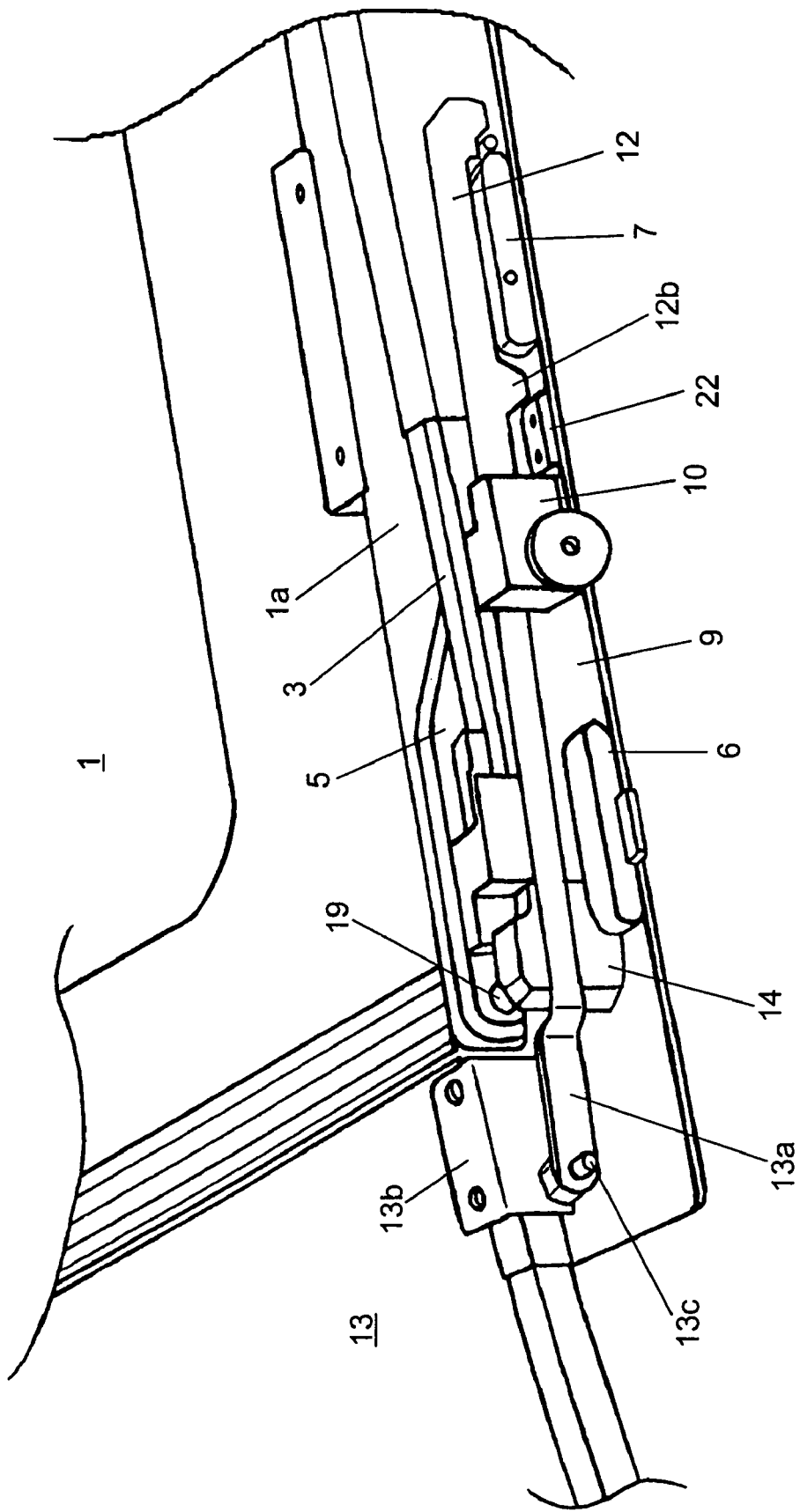
FIG. 14 shows a perspective view of the drive mechanism according to the area I of FIG. 1.

The perspective view of FIG. 14 shows the area I of FIG. 1 in greater detail.

FIG. 14 reveals that a bearing bracket 10 is immovably fixed to the guide rail 9, the bearing bracket being situated in front of the second slide element 7 in the direction of travel. A catch lever 12, which with a hook-shaped end 12a can engage in a corresponding extension 7a of the second slide element 7 (cf. FIG. 15), is articulated on the bearing bracket 10. The catch lever 12 moreover has a cam 12b, which is capable of interacting with a corresponding extension 6b of the first slide element 6.

A stop 22 in form of a block element is fixedly attached to the guide rail 9 in the vicinity of the bearing bracket 10. The functioning of the block element 22 is further explained below.

Figure 15:
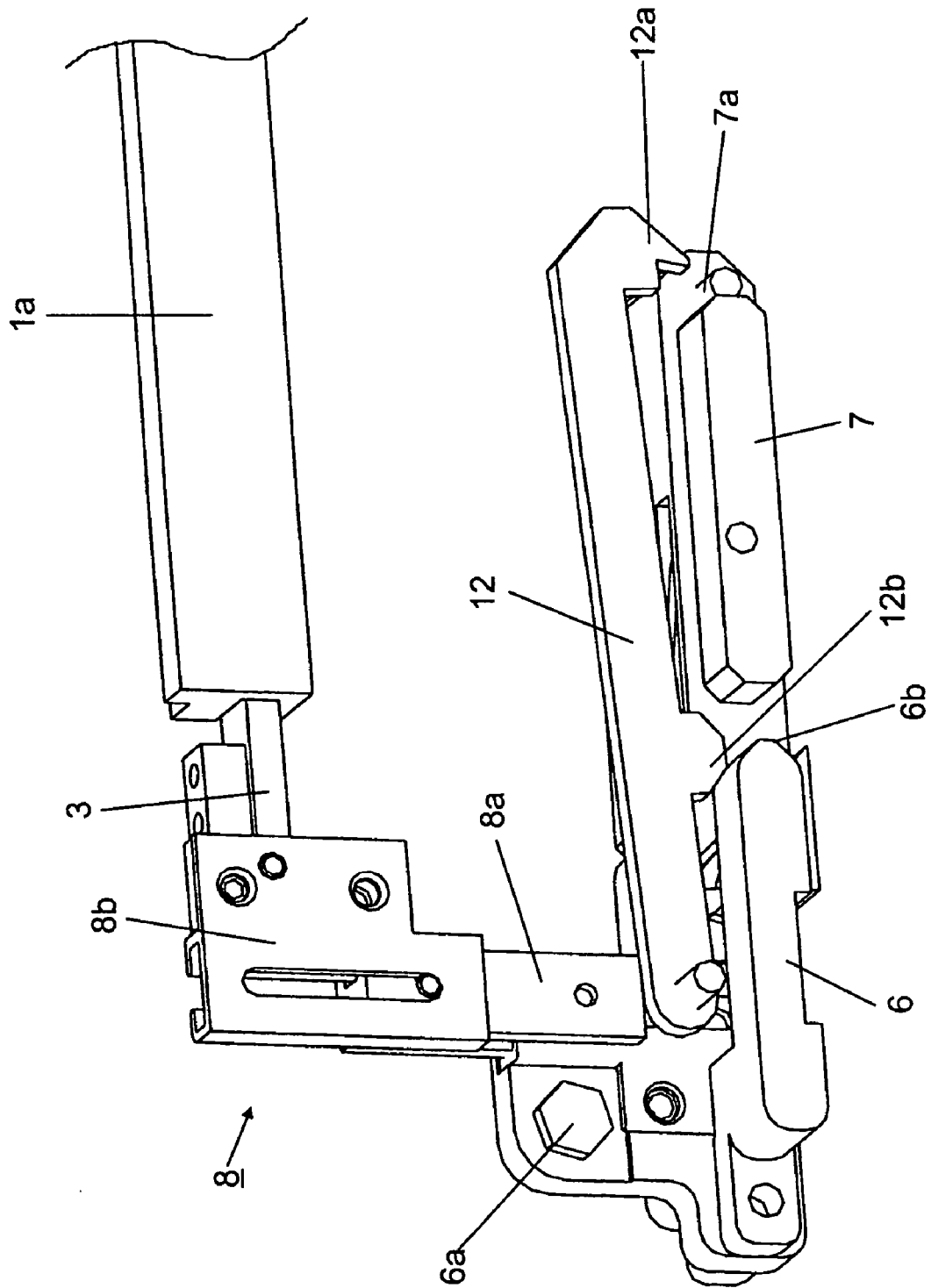
FIG. 15 shows a perspective view of the drive mechanism omitting some components.

The articulation of the catch lever 12 at the bearing bracket 10 is further shown in FIG. 15. For reasons of clarification only, the outline of the bearing bracket 10 is not shown in FIG. 15.

Figure 16:
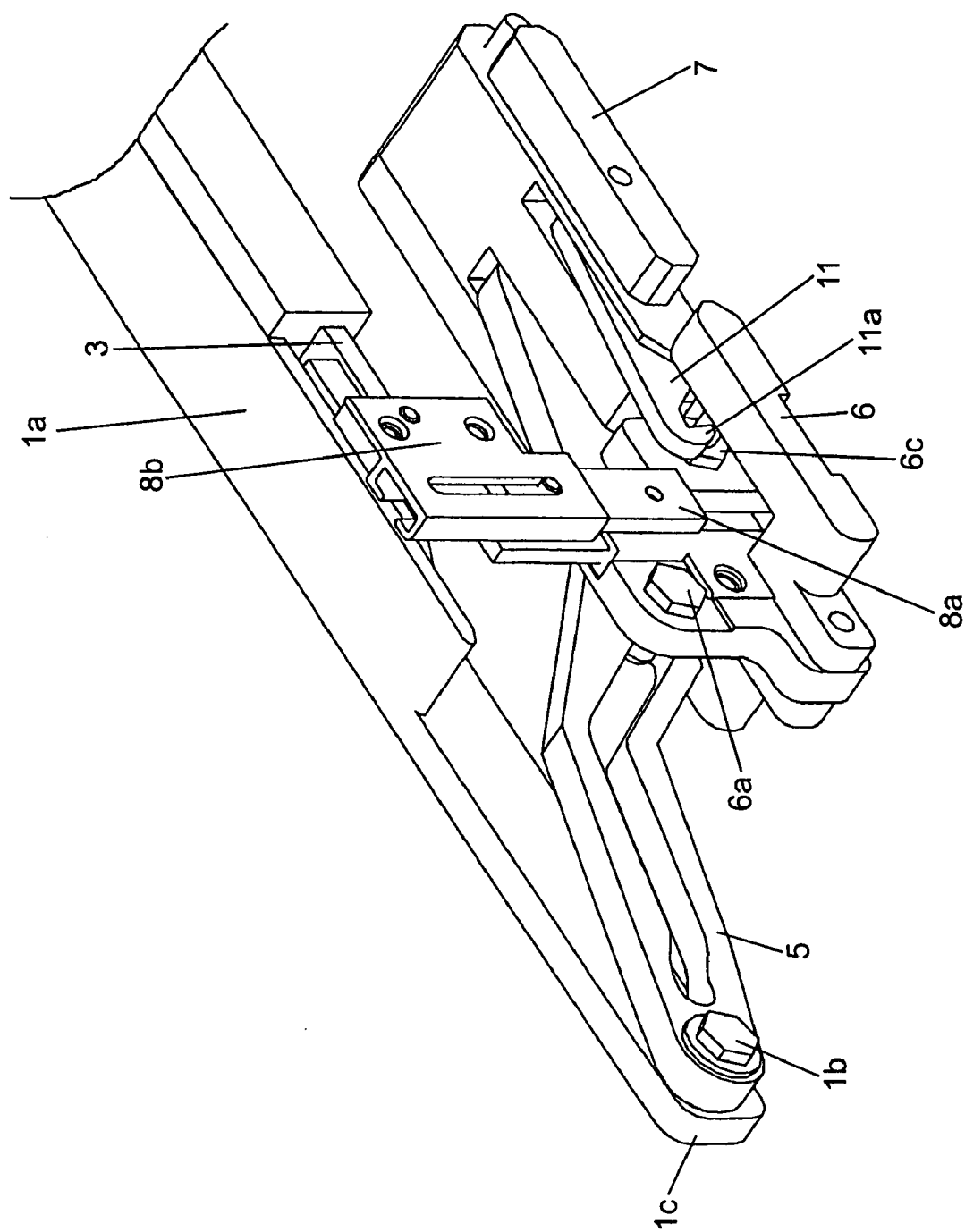
FIG. 16 shows a perspective view of a part of the drive mechanism omitting some components.

As shown in FIG. 16, an essentially hook-shaped coupling element 11 is articulated on the second slide element 7, a hook-shaped end 11a of the coupling element 11 being capable of interacting with a corresponding recess 6c of the first slide element 6.

Figure 17:
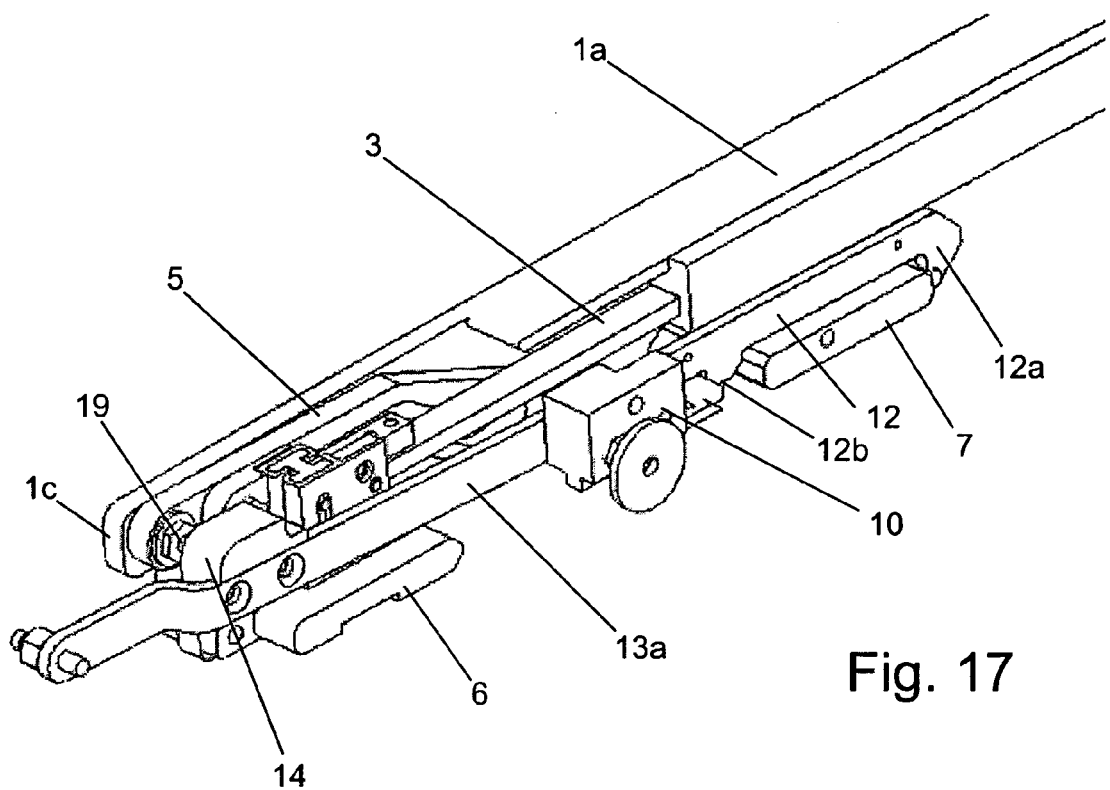
FIG. 17 shows a perspective view of a part of the drive mechanism of FIG. 13 omitting some components.

FIG. 13, FIG. 14 and FIG. 17 reveal that a wind deflector lever 13a is articulated on one end on the bearing bracket 10, a carrier plate 13b being articulated by way of a guide slot on the other end of the wind deflector lever 13a. The wind deflector lever 13a is in turn connected to the control lever 5 by way of a drive block 14, so that it slides on the former lever, i.e. the drive block is slidably engaged with the control lever 5.

At a distal end of the control lever 5 facing the drive block 14, a pin 19 is fixedly attached which is connected with the drive block 14. When the distal end of the control lever 5 is raised due to a backwards sliding movement of the first slide element 6, the pin 19 fixedly connected to the control lever 5 lifts the drive block 14 so as to raise the wind deflector lever 13a therewith.

As shown in FIG. 14, a bolt 13c is attached to the wind deflector lever 13a at its end opposite the bearing bracket 10. One end of the bolt 13c facing the carrier plate 13b is guided in the guide slot formed at the carrier plate 13b. By means of the guide slot, the different positions of the rotational axis of the wind deflector lever 12a and the wind deflector 13 can be compensated. The wind deflector 13 is articulated on the vehicle or at the front edge of the roof opening via a suitable hinge so that the rear edge of the wind deflector 13 can be raised counter to the direction of travel, for example when the roof part 1 is moved into second position (cf. FIG. 5).

Figure 18:
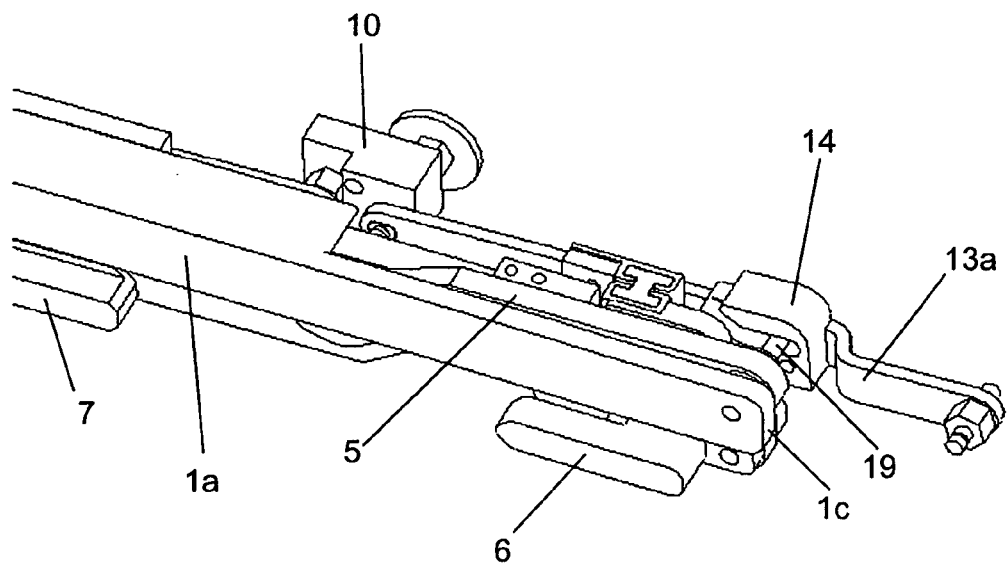
FIG. 18 shows a rear perspective view of the drive mechanism of FIG. 17.

FIG. 18 is a rear view of that of FIG. 17, and shows that the drive block 14 comprises a recess (in FIG. 18 at its rear side) in which the wind deflector lever 13a is slidably engaged. This recess forms an open guide slot. This means that the drive block 14 can be slided along the wind deflector lever 13a. The engagement of the drive block 14 with the wind deflector lever 13a is also shown in FIG. 14. Further details thereto are explained below.

The first slide element 6 is connected to a driving cable 21, which is capable of transmitting both push and pull forces, so that the first slide element 6 can be moved along the guide rail 9 driven by the driving cable 21.

Figure 19:
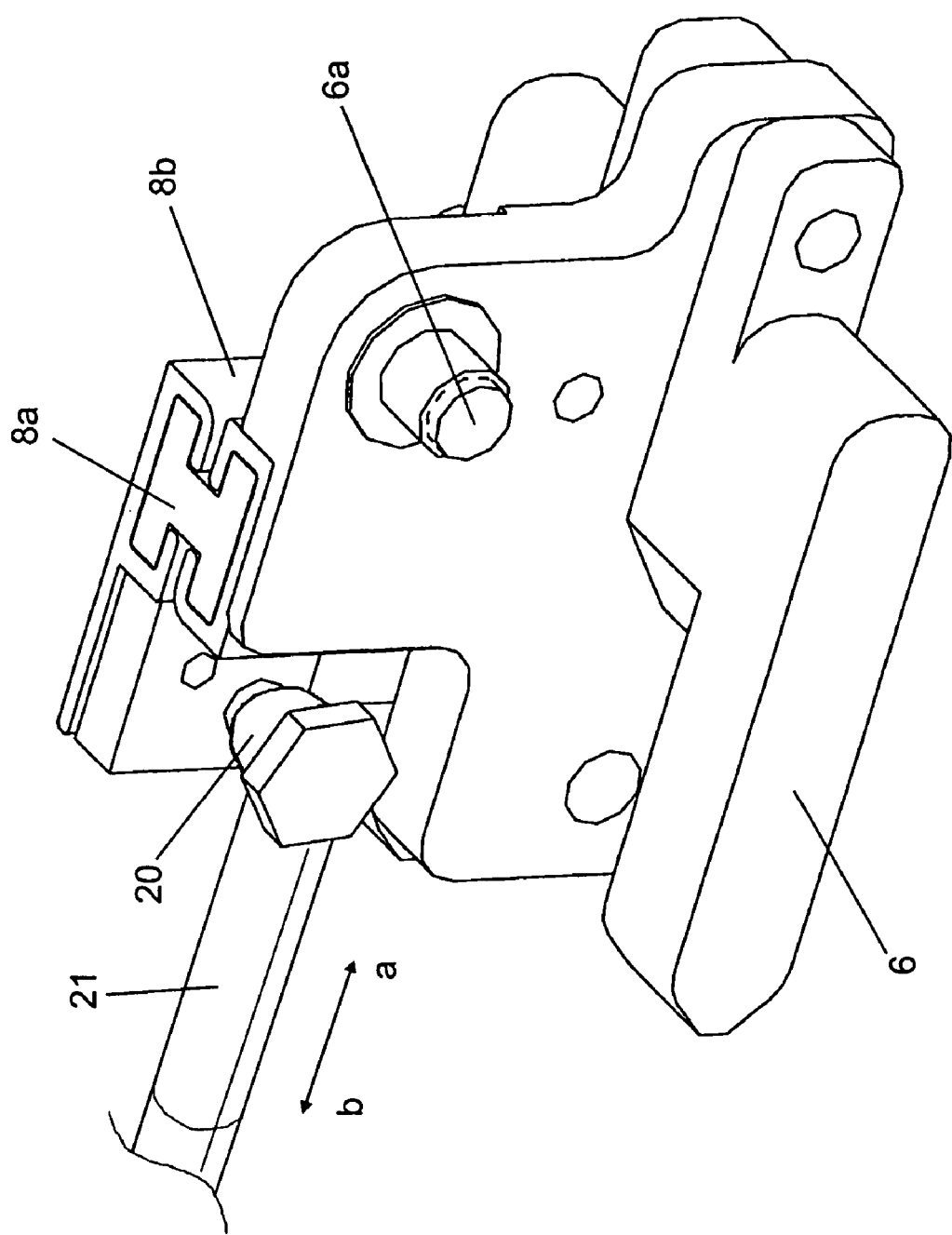
FIG. 19 shows a first slide element of the drive mechanism omitting some components thereof.
Figure 20:
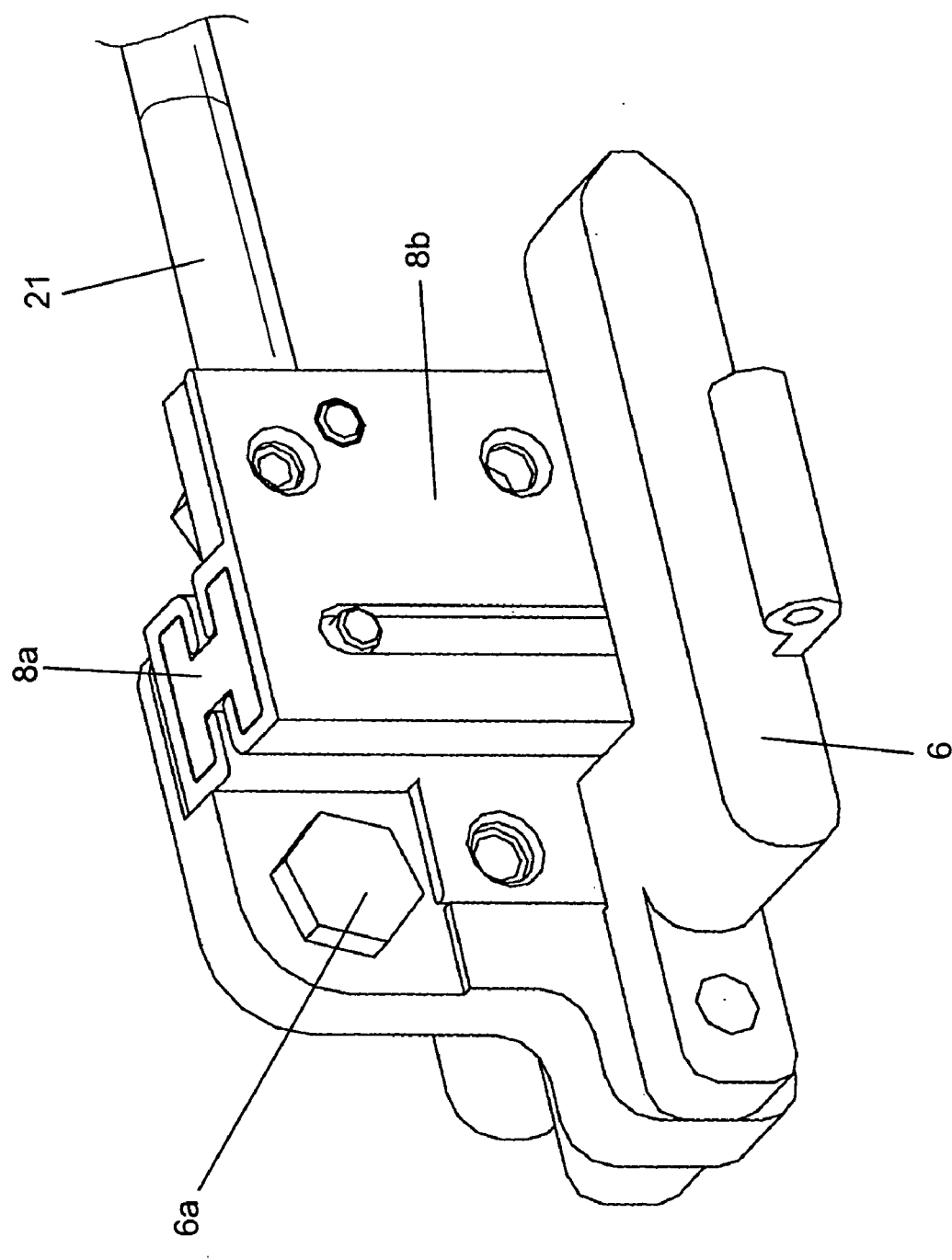
FIG. 20 shows a rear perspective view of the first slide element of FIG. 19.

FIG. 19 shows a perspective view of the first slide element 6, wherein some elements of the moving mechanism are omitted for reasons of simplification only. A bolt 20 is fixed to the first slide element 6 so as to fix a free end of the driving cable 21 thereto. As depicted by the arrows a and b in FIG. 19, push forces (arrow a in direction to the front of the vehicle) and pull forces (arrow b in the direction of the rear of the vehicle) can be transmitted by said driving cable 21 to the first slide element 6. Contrary to all other parts as i.e. the second slide element 7, the push rod 3 or the like, the first slide element 6 is the only part of the vehicle roof which is driven by the driving cable 21. For further clarification of the first slide element 6, FIG. 20 shows the opposite part of the first slide element 6 in comparison to FIG. 19. The telescopic guide 8 is in its rest position wherein the upper part 8b is essentially fully accommodated on the lower part 8a.

Figure 21:
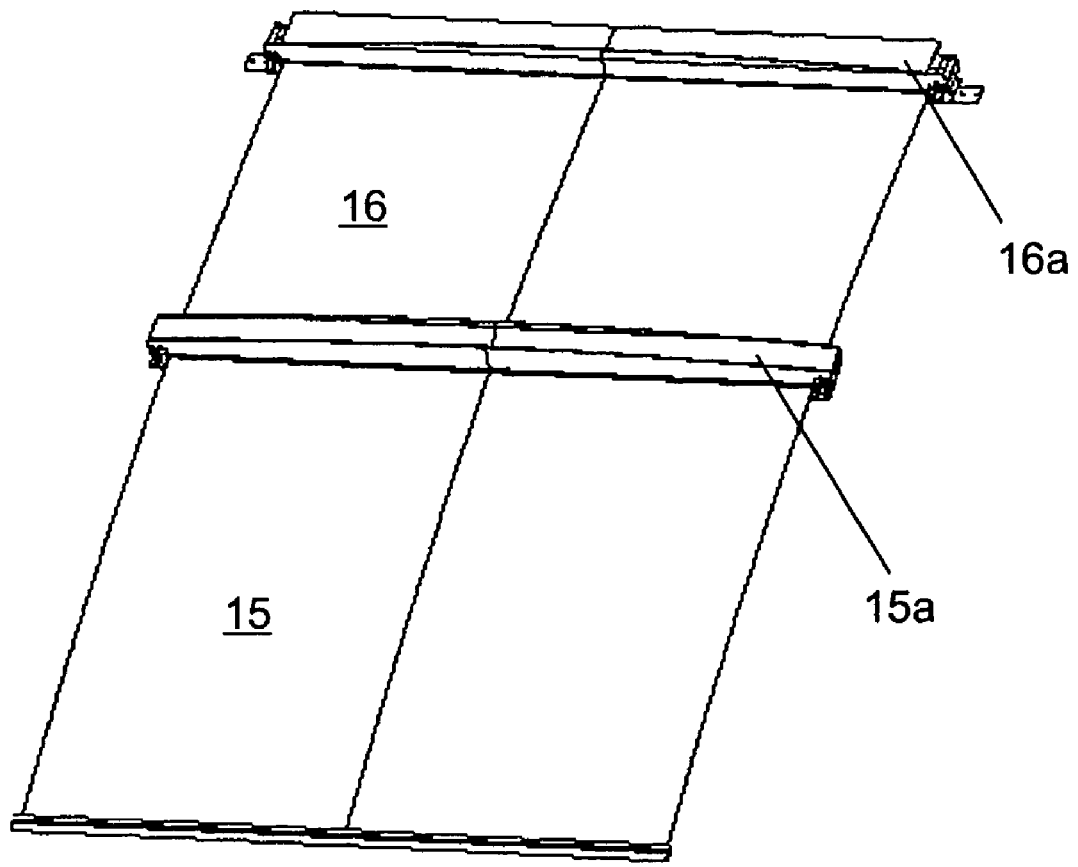
FIG. 21 shows a view of an anti-glare device, in the form of a two-part reel, for the vehicle roof.

In a preferred embodiment of the vehicle roof a driveable, opening anti-glare device is furthermore provided. As shown in FIG. 21, this anti-glare device comprises a first driveable reel 15 and a second driveable reel 16, which are each provided in reel holders 15a, 16a fitted to the guide rails 9. The reels 15, 16 are carried in the guide rails 9.

The invention now functions as follows:

With the roof closed, as shown e.g. in FIG. 1 or FIG. 4, the push rod 3 is maximally displaced in the direction of travel relative to the support element 1a (position shown in FIG. 8), so that the guide element 3a is at minimum elevation in the area of the centre foot 4c of the roof luggage rail 4.

Figure 22:
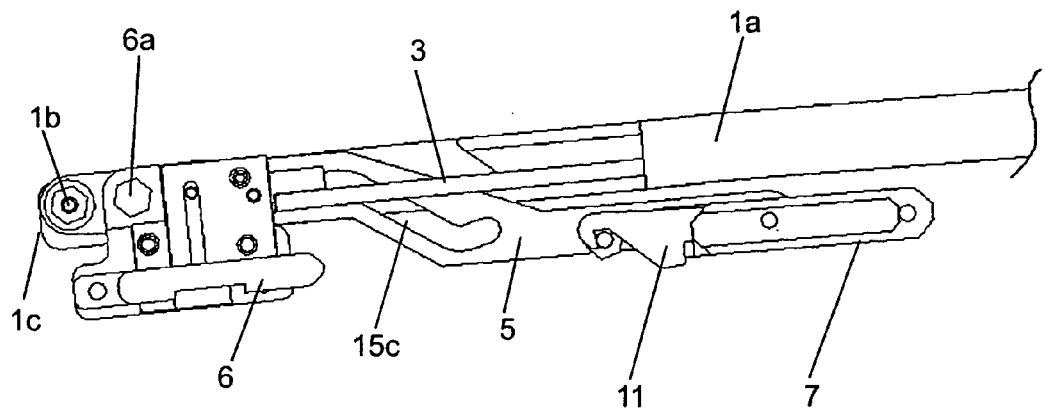
FIG. 22 shows a plain view of the drive mechanism of FIG. 17 from the side.

In the first closed roof position, the push rod 3 is maximally displaced forward, i.e. in the direction of travel, so that the guide element 3a is positioned as shown in FIG. 8. As shown in FIG. 22, in the closed roof position the first slide element 6 has a maximal distance to the second slide element 7, wherein the end of the push rod 3 opposite to the guide element 3a is articulated on the upper half 8b of the telescopic guide 8. In the position shown in FIG. 22, the second slide element 7 is blocked by the catch lever 12 because the hook-shaped end 12a of the catch lever 12 engages with the extension 7a of the second slide element 7 (cf. also FIG. 15). Thus, in this position a movement of the second slide element 7 relative to the guide rail 9 is not possible.

Starting from an arrangement of the mechanism as shown in FIG. 22, in the course of an opening movement of the roof panel 1 the first slide element 6 is now first displaced toward the rear of the vehicle by means of the driving cable 21 fitted to it. Through the interaction of the link pin 6a with the slotted link 5a in the area of the first bent area 15a in the slotted link 5a of the control lever 5, the roof panel 1 or the support element 1a is slightly elevated in its front edge area (front end area ac of the support element 1a, cf. FIG. 16 to FIG. 18 for example), so that the roof panel 1 separates from its seals. At the same time a rear edge area of the roof panel 1 is also slightly elevated by the guide element 3a moving slightly upward (depicted by arrow c in FIG. 9) in the lateral guide 4a of the rail element 4 in the area of the centre foot 4c.

Once this slight initial movement section to release the seal has been exceeded, the link pin 6a passes through the straight, level area 15b of the slotted link 5a, the front edge area of the roof panel 1 thereby not being elevated further. At the same time the guide element 3a performs the remainder of its travel relative to the support element 1a and hence to the roof panel 1 in the recess 3b and a further upwardly inclined part of the lateral guide 4a, so that the roof panel 1 is elevated further in its rear edge area without the roof panel 1 as a whole moving toward the rear of the vehicle. A ventilation position of the roof panel 1 is accordingly attained (see FIG. 23 and FIG. 6), in which the roof panel 1 is essentially raised in its rear edge area and overall is inclined downward in the direction of travel.

Figure 23:
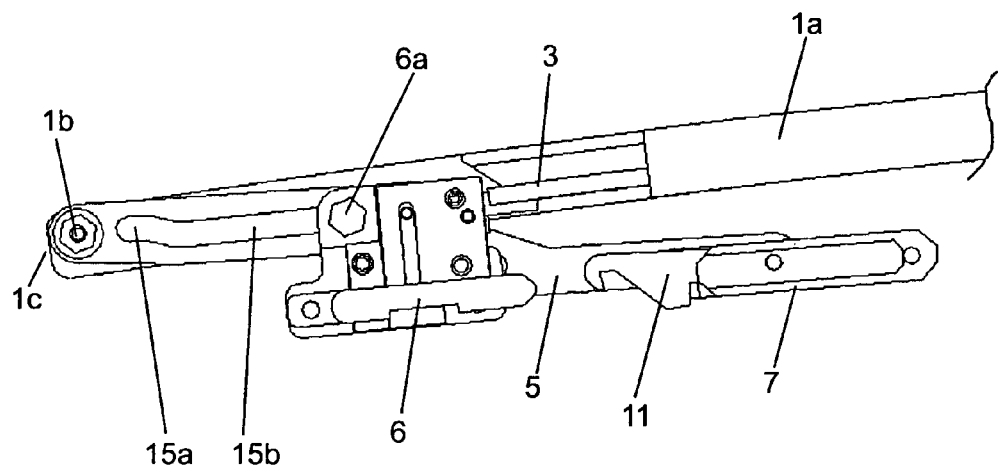
FIG. 23 shows the drive mechanism in FIG. 22 in an inclined ventilation position.

The aforementioned ventilation position of the roof panel 1 is designated as the third, partially opened roof position as shown in FIG. 6. The movement of the first slide element 6 from the position of FIG. 22 backwards to the position of FIG. 23 is transmitted to the push rod 3, which is moved relative to the support element 1a so that the opposite end of the push rod 3, to which the guide element 3a is attached, is moved to the end of the recess 3b. This end position of the guide element 3a with respect to the recess 3b is depicted by arrow d in FIG. 8. The length of the recess 3b provided in the support element 1a is sufficient so that the guide element 3a climbs up the center foot region 4c of the lateral guide 4a of the rail element 4. As a result, if the guide element 3a has reached the position of arrow d shown in FIG. 8, it comes to the end of the center foot area 4c which is depicted by arrow e in FIG. 9. As a result, the rear edge of the roof panel 1 is raised up to the level of the rear rail area 4b.

In a further movement of the first slide element 6 counter to the direction of travel, the link pin 6a now passes through the straight, inclined area 15c of the slotted link 5a, as a result of which the control lever 5 forces the front end of the support element 1a and hence the front edge area of the roof panel 1 upward. In the process the telescopic guide 8 connecting the support element 1a and the first slide element 6 is extended, as shown in FIG. 15.

This also causes the control lever 5, the drive block 14 and the wind deflector lever 13a to execute a lifting movement of the wind deflector 13. Once the control lever 5 disengages from the drive block 14, which has an open guide slot, in the further course of an opening movement, the wind deflector 13 is held spring-loaded in its raised position by a coil spring (not shown).

The roof panel 1 is not fully displaced in its entirety toward the rear of the vehicle until such time as an essentially horizontal, elevated position of the roof panel 1 is reached, since the second slide element 7 is still secured by the catch lever 12 as at the start of the opening movement.

In the first closed roof position and the partially opened third roof position, the first slide element 6 and the second slide element 7 are only connected via the control lever 5 wherein the link pin 6a of the first slide element 6 engages with the slotted link 5a of the control lever 5. A movement of the second slide element 7 and also a movement of the roof panel 1 towards a rear of the vehicle is prevented by the catch lever 12 being pivotally connected to the guide rail 9 via the bearing bracket 10.

Figure 24:
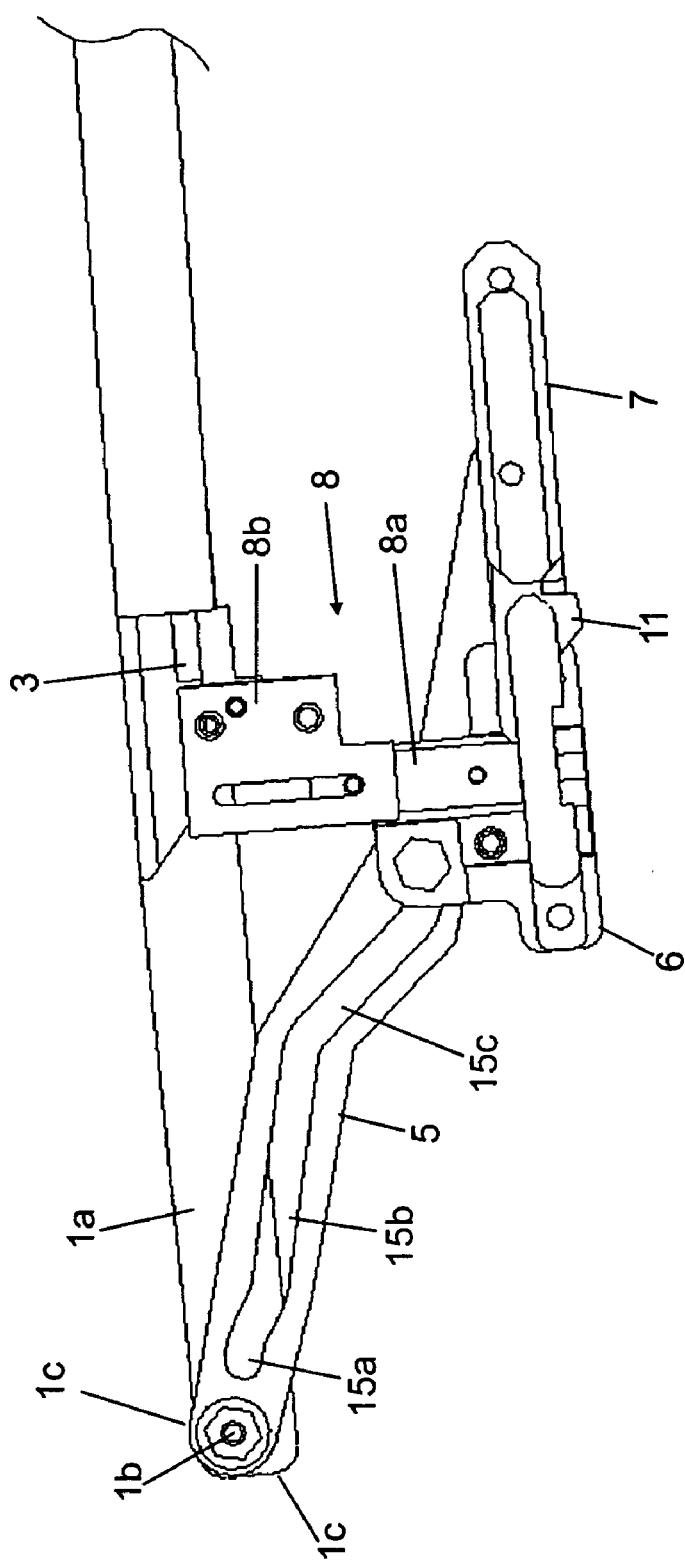
FIG. 24 shows the drive mechanism of FIG. 17 in a fully opened position.

In the position shown in FIG. 24 the first slide element 6 finally encounters the second slide element 7, the first slide element 6 previously having run over the cam 12b of the catch lever 12 and elevated the catch lever 12 in order to release the second slide element 7.

The pivoting of the control lever 5 upwardly (clockwise in FIG. 16 and FIG. 23 for example) leads to a lifting of the front end area 1c of the support element 1a so as to raise the front edge of the roof panel 1. In the position of the first slide element 6 shown in FIG. 24, the front end area 1c of the support element 1a and thus the front edge of the roof panel 1 are raised up to the level of the rear rail area 4b. Simultaneously, the push rod 3, which is connected to the first slide element 6 via the telescopic guide 8, is moved to the rear direction within the support element 1a. This makes the guide element 3a moving within the lateral guide 4a. As explained above, in the position of the first slide element 6 shown in FIG. 24 the guide element 3a is moved to the position indicated by the arrow d in FIG. 8, so that the guide element 3a is guided within the lateral guide 4a up to the position indicated by the arrow e in FIG. 9.

As shown in FIG. 15, when the first slide element 6 comes into the vicinity of the second slide element 7, the extension 6b of the first slide element 6 abuts against the cam 12b of the catch lever 12 so that the catch lever 12 is lifted upwards, i.e. in the counterclockwise direction in FIG. 15. This lifting of the catch lever 12 disengages its hook-shaped end 12a from the extension 7a of the second slide element 7. As a result, the second slide element 7 is no longer blocked by the catch lever 12 and is movable relative to the guide rail 9 in the longitudinal direction, respectively. When the first slide element 6 is further moved to the rear direction, i.e. counter to the direction of travel (right direction in FIG. 15), it abuts against the second slide element 7 so that both elements 6, 7 travel together to the rear direction.

When the first slide element 6 abuts against the second slide element 7, the latter is still blocked by the catch lever 12. The catch lever 12, which is connected to the guide rail 9 via the bearing bracket 10, is raised by the extension 6b of the first slide element 6 in form of a slant tip end, so as to release the second slide element 7. Subsequently, the movement of the first slide element 6 towards a rear of the vehicle also moves the released second slide element 7 in the same direction.

Once the two slide elements 6, 7 have together traveled beyond the starting position of the second slide element 7, the coupling element 11 is furthermore released, which thereby engages in a corresponding recess 6c in the first slide element 6. In the subsequent closing movement of the vehicle roof, this engagement allows the second slide element 7 to be also carried in this direction by the single driven first slide element 6 which is the only driven part. When the starting position of the second slide element 7 during the closing movement is reached again, a release of the first slide element 6 from the second slide element 7 is achieved due to the coupling element 11 encountering the corresponding stop 22 in the vicinity of the bearing bracket 10.

The release of the coupling element 11 means that once the first slide element 6 abuts against the second slide element 7, the coupling element 11 being articulated on the second slide element 7 is moved off the block element 22 so as to engage in the corresponding recess 6c of the first slide element 6.

The functioning of the block element 22 is to serve as a rest surface for the tip end of the coupling element 11 as long as the second slide element 7 is secured by the catch lever 12. This means that the hook-shaped end 11a of the coupling element 11 rests on the block element 22 as long as the first slide element 6 has not reached the second slide element 7. As soon as the first slide element 6 abuts against the second slide element 7 so that both elements travel together in the rear direction, the hook-shaped end 11a is moved off the block element 22 so that the coupling element 11 pivots downwards, i.e. in the counterclockwise direction of FIG. 16.

Figure 25:
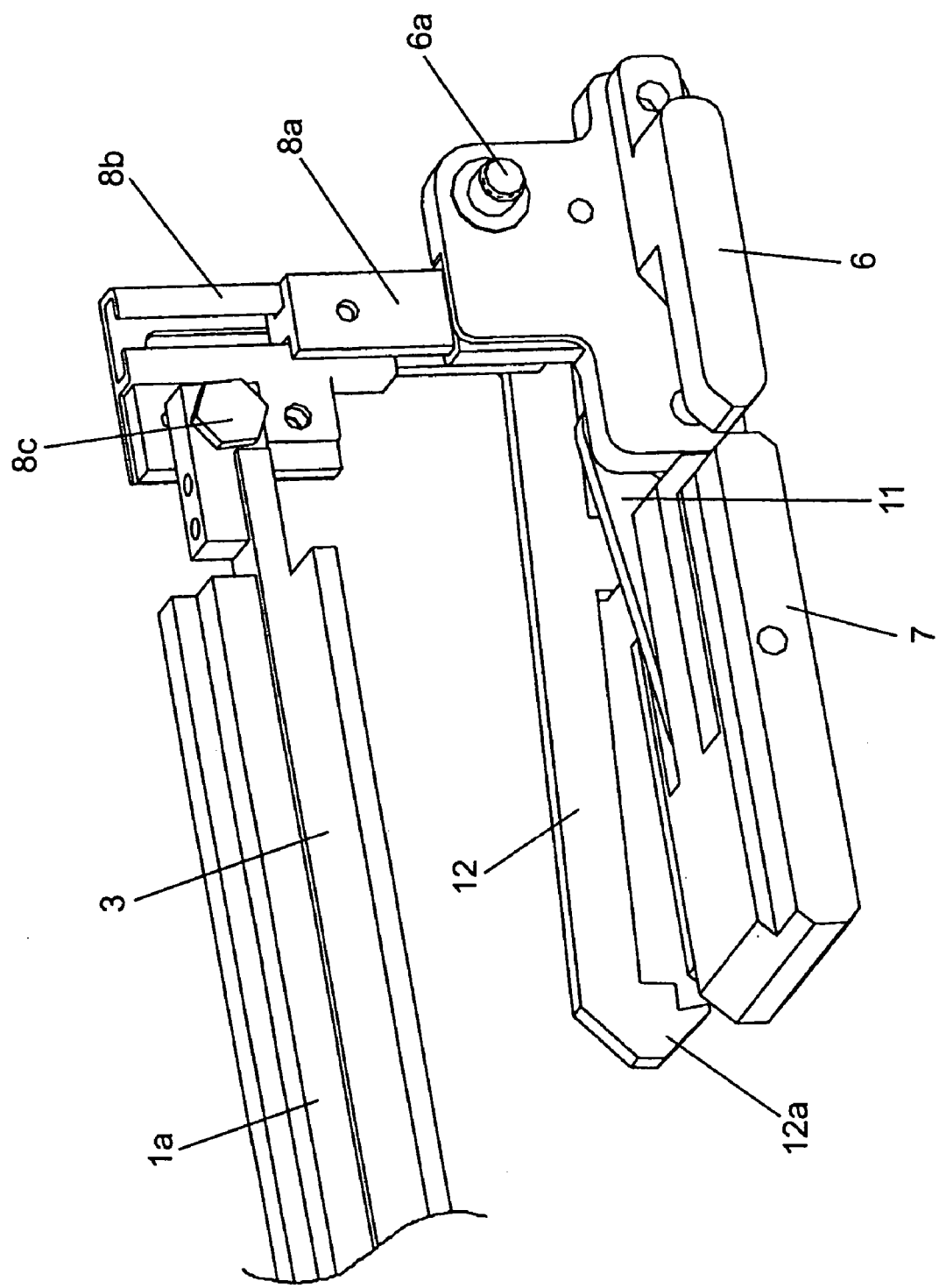
FIG. 25 shows a rear perspective view of the drive mechanism of FIG. 10 omitting some components.

FIG. 25 is a rear view of FIG. 16 illustrating the first and second slide elements 6, 7, wherein some parts, for example the control lever 5 are omitted for reasons of simplification only. According to FIG. 25, the coupling element 11 locks with the first slide element 6 by pivoting downwards in the clockwise direction when the first and second slide elements 6, 7 have traveled together beyond the starting position of the second slide element 7. As a result, the hook-shaped end 11a engages with the corresponding recess 6c in the first slide element 6 so as to lock the second slide element 7 to the first slide element 6. Thus, the second slide element 7 is coupled to the first slide element 6.

When the first slide element 6 and the second slide element 7 travel together to the rear of the vehicle, the guide element 3a being in the position of arrow d shown in FIG. 8 is simultaneously guided within the lateral guide 4a backwards to the rear rail area 4b as shown for example in FIG. 9. In its fully opened position, i.e. the second roof position, the roof panel 1 reaches the position as shown in FIG. 3 and FIG. 5 for example.

During a closing movement of the vehicle roof, the first slide element 6 is moved forwardly, i.e. in the direction of travel. Because of the coupling by means of the coupling element 11, the second slide element 7 is moved forwardly together with the first slide element 6. If the hook-shaped end 11a of the coupling element 11 comes in contact again with the block element 22, the coupling element 11 is moved upwardly so as to disengage from the recess 6c. This decouples the second slide element 7 from the first slide element 6. Further, when the first slide element 6 travels further forwardly independent from the second slide element 7, the extension 6b comes out of engagement from the cam 12b of the catch lever 12. As a result, the catch lever 12 drops down (i.e. in the clockwise direction of FIG. 15) and engages with the extension 7a so as to secure the second slide element 7 with respect to the guide rail 9 and the longitudinal direction of the vehicle, respectively.

The position of the drive mechanism of the vehicle roof according to the invention shown in FIG. 24 therefore corresponds to a fully opened position of the roof panel 1 (see FIG. 3, FIG. 5 for example) and also to a partially opened position in which the roof panel 1 has been only partially moved toward the rear of the vehicle and is disposed essentially parallel and elevated in relation to the rest of the vehicle roof (cf. FIG. 7).

The partially opened position, in which the roof panel 1 is held in a position essentially parallel to the rest of the vehicle roof and at a distance from the rest of the vehicle roof, is designated as a fourth position and is shown e.g. in FIG. 7. In this roof position, the drive mechanism is also in the position according to FIG. 24. As explained above, because of the interaction of the link pin 6a with the straight inclined area 15c of the slotted link 5a, the front end area 1c of the support element 1a, which is connected by the hinge 1b to the control lever 5, is lifted up to the level of the rear rail area 4b of the rail element 4. This brings the roof panel 1 into the position essentially parallel to the rest of the vehicle roof and at a distance therefrom, since the rear edge of the roof panel 1 is lifted simultaneously by moving the guide element 3a inside the lateral guide 4a backwards.

A kinematic characteristic of the vehicle roof according to the invention is that the roof panel 1 is first elevated to a position essentially parallel to the rest of the roof (as shown in FIG. 7, wherein the drive mechanism is in the position of the FIG. 24, for example) before the roof panel 1 is moved towards the rear of the vehicle, into its fully opened position as shown, for example, in FIG. 3 and FIG. 5. At the start of the opening movement of the roof panel 1, the second slide element 7 is secured with respect to the longitudinal direction of the vehicle roof by said catch lever 12 until the catch lever 12 is released by the interaction of the extension 6b of the first slide element 6 with the cam 12b. Thus, the roof panel 1 is not moved towards the rear of the vehicle until it has reached its fourth roof position. Subsequently, after the first slide element 6 abuts against the second slide element 7, a common movement of the first and second slide elements 6, 7 towards the rear of the vehicle is possible. When the first slide element 6 travels backwards together with the second slide element 7, the support element 1a is also moved backwards so as to open the vehicle roof. Simultaneously, the drive block 14 being attached to the control lever 5 which is hinged to the support element 1a is also moved to the rearward direction so that is comes out of engagement of the wind deflector lever 13a. By means of a coil spring or the like, the wind deflector 13 is then held in its raised position as shown in FIG. 5 for example, The vehicle roof according to the invention further comprises a cassette holder 23 as shown in FIG. 1. The cassette holder 23 can be pre-assembled with the movable roof part 1 and the non-opening roof part 2 and is adapted to an opening provided in the vehicle roof. Thus, the cassette holder 23 can be fitted into this opening of the vehicle roof so as to mount the roof parts 1 and 2 and the corresponding driving mechanism to the vehicle roof.

What is claimed is:

1. A vehicle roof, comprising
   an opening roof panel, which can be moved from a first, closed roof position into a second, fully opened roof position, the roof panel being held parallel to the rest of the vehicle roof and at a distance from the rest of the vehicle roof in the second roof position;
   a lateral guide, the roof panel being guided at least during a part of an opening movement on the guide;
   a third, partially opened roof position in which the roof panel is held in a position that is inclined with respect to the rest of the vehicle roof, rising counter to the direction of travel;
   an elevating means for elevating a front edge area of the roof panel, said elevating means comprising a control lever with a slotted link, and
   a first and a second slide element which are moveably guided in longitudinal direction of said vehicle roof, said first slide element being displaceable connected with said slotted link and said control lever being pivotally connected with said second slide element, said second slide element being releasably fixable to said first slide element by means of a coupling element and releasably held by means of a catch lever at the start of the opening movement so as to secure said second slide element with respect to the longitudinal direction of said vehicle roof until said first slide element elevates the catch lever in order to release said second slide element such that said roof part in its entirety is not moved towards the rear part of the vehicle until reaching an essentially horizontal, elevated position.

2. The vehicle roof as claimed in claim 1, wherein a fourth, partially opened roof position is provided, in which the roof panel is held in a position essentially parallel to the rest of the vehicle roof and at a distance from the rest of the vehicle roof.

3. The vehicle roof as claimed in claim 1, wherein the lateral guide is formed on a rail element, which stands proud of a surface of the vehicle roof.

4. The vehicle roof as claimed in claim 1, wherein a guide element supporting the roof panel on the lateral guide and moveable in the lateral guide is provided, the guide element being moveable in relation to the roof panel.

5. The vehicle roof as claimed in claim 1, wherein the elevating means comprises a telescopic guide.

6. The vehicle roof as claimed in claim 5, wherein the roof panel is connected to said first slide element which is accommodated in a guide rail so that it can move in said guide rail.

7. The vehicle roof as claimed in claim 6, wherein the first slide element is connected by means of a push rod to a guide element assigned to the lateral guide, the guide element being moveable in relation to the roof panel.

8. The vehicle roof as claimed in claim 6, wherein the first slide element is driven by driving means so as to move with respect to the longitudinal direction of said vehicle roof.

9. The vehicle roof as claimed in claim 1, wherein the first slide element can be driven by means of a driving cable that is capable of transmitting both push and pull forces.

10. The vehicle roof as claimed in claims 1, wherein a non-opening, transparent roof element is arranged behind the roof panel in the direction of travel.

11. The vehicle roof as claimed in claim 1, wherein a driveable, opening anti-glare device is provided on the vehicle roof.

12. The vehicle roof as claimed in claim 11, wherein the anti-glare device comprises a first driveable reel and a second driveable reel.

13. The vehicle roof as claimed in claim 1, wherein the vehicle roof comprises a holder which can be pre-assembled, which can be inserted into an opening in the vehicle roof corresponding to the holder.

14. The vehicle roof as claimed in claim 1, wherein a pivotable wind deflector is provided on the vehicle roof.

15. The vehicle roof as claimed in claim 14, wherein the wind deflector can be raised by an opening movement of the roof panel in a positively controlled manner.

16. The vehicle roof as claimed in claim 15, wherein the wind deflector is operatively connected to said control lever which at the same time drives the roof panel so as to raise the roof panel up from the rest of the vehicle roof.

17. The vehicle roof as claimed in claim 16, wherein the control lever can be disengaged from the wind deflector when opening the roof panel.

18. The vehicle roof as claimed in claim 1, wherein once the first and second slide elements have traveled beyond the starting position of the second slide element the second slide element is releasably fixed to said first slide element by means of the coupling element.

* * * * *